(No Model.)

J. C. WELLS.
BICYCLE LANTERN BRACKET.

No. 534,934. Patented Feb. 26, 1895.

WITNESSES:
F. McArdle.
Theo. J. Hoster

INVENTOR
J. C. Wells
BY
Munn & Co.
ATTORNEYS.

UNITED STATES PATENT OFFICE.

JOHN CHAPPELL WELLS, OF EAST HAMPTON, CONNECTICUT.

BICYCLE-LANTERN BRACKET.

SPECIFICATION forming part of Letters Patent No. 534,934, dated February 26, 1895.

Application filed April 10, 1894. Serial No. 506,994. (No model.)

*To all whom it may concern:*

Be it known that I, JOHN CHAPPELL WELLS, of East Hampton, in the county of Middlesex and State of Connecticut, have invented a new and Improved Bicycle-Lantern Bracket, of which the following is a full, clear, and exact description.

The object of the invention is to provide a new and improved bicycle lantern bracket, which is simple and durable in construction, readily adjusted for various sized heads, and arranged for convenient and quick detachment, together with the lamp carried by it.

The invention consists principally of a clip provided with a saddle, and a clip bar or band connected at one end with the saddle and at its other end with the bracket.

The invention also consists of certain parts and details, and combinations of the same, as will be hereinafter described and then pointed out in the claims.

Reference is to be had to the accompanying drawings, forming a part of this specification, in which similar letters of reference indicate corresponding parts in all the figures.

Figure 1:
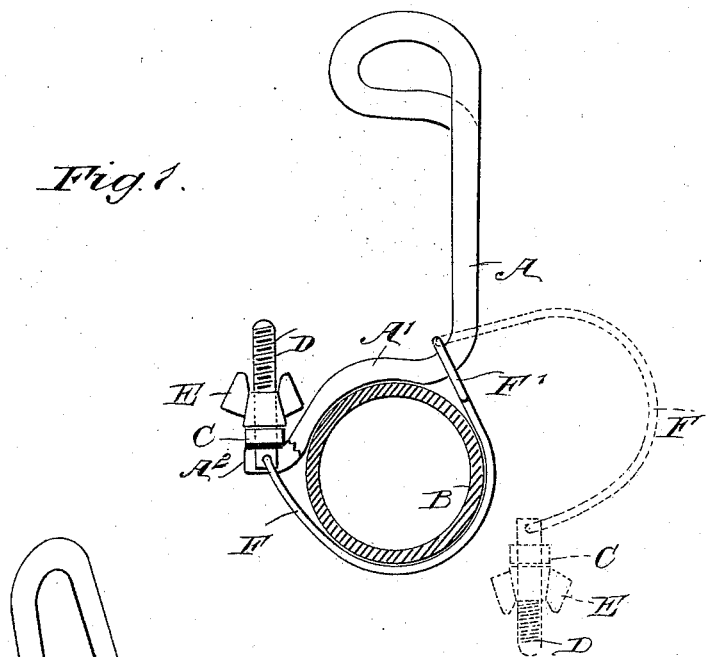
Figure 2:
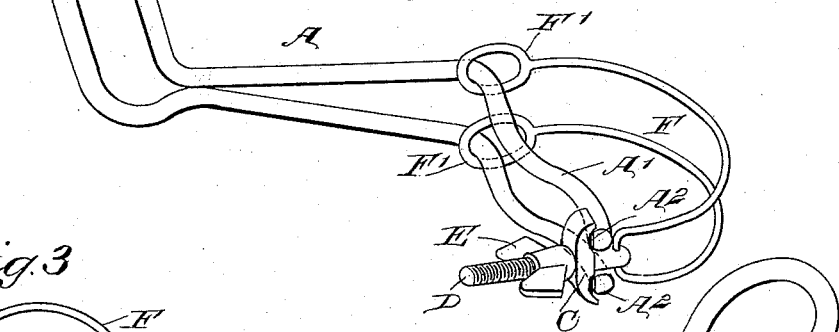
Figure 3:
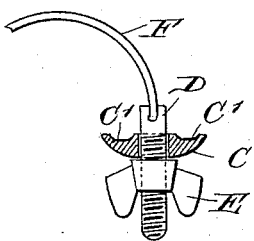

Figure 1 is a sectional plan view of the improvement, as applied and with the tube head in section. Fig. 2 is a perspective view of the improvement. Fig. 3 is a sectional elevation of the saddle, the bolt and part of the clip bar; and Fig. 4 is a perspective view of a modified form of bracket.

Figure 4:
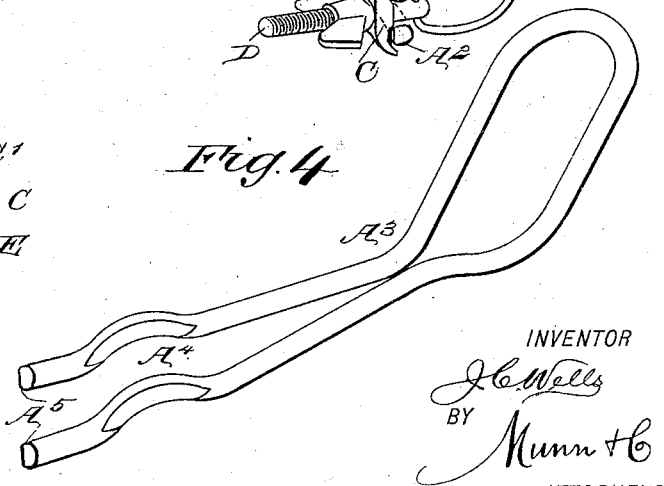

The improved bicycle lantern bracket is provided with the bracket proper A, preferably made of a single piece of wire bent as shown in Figs. 1 and 2 to form the curved portion A' adapted to fit on one side of the tube head B of the bicycle or said wire may be bent and formed as shown in Fig. 4 and hereinafter described. The ends of the bracket A next to the curved portion A' are flattened as at $A^2$, to form a seat for the saddle C, provided on its under surface with notches C', fitting onto the flattened portions $A^2$ of the bracket proper A.

In the saddle C is fitted loosely a bolt D, extending between the ends of the bracket proper A, and on the said bolt screws a wing nut E, engaging the outer face of the saddle C. The inner end of the said bolt D is engaged by the clip bar or band F, preferably made of a single piece of wire doubled up to engage with its middle portion the said bolt D, as plainly illustrated in Figs. 1, 2 and 3. The ends of this clip F are formed with eyes F', engaging the bars of the bracket proper A at the rear of the curved portion A', as plainly shown in Figs. 1 and 2.

Now, it will be seen that by screwing up the wing nut E, the clip F is drawn tight around the tube head B, so as to securely clamp the curved portion A' onto the said tube head to securely hold the lantern bracket in place. By screwing the wing nut E outward to free the saddle C, I am enabled to swing the latter off the flattened ends $A^2$ of the bracket proper A to disengage the entire lantern bracket from the tube head, as will be readily understood by reference to the dotted lines in Fig. 1.

The lantern bracket proper $A^3$ shown in Fig. 4, is slightly different in shape from the one illustrated in Figs. 1 and 2, but is provided with the curved portions $A^4$ and the flattened ends $A^5$ for the purpose above described.

Having thus fully described my invention, I claim as new and desire to secure by Letters Patent—

1. A bicycle bracket comprising a bracket proper formed of a length of wire doubled upon itself and bent outwardly at its closed end to support a lantern, a clip having eyes at one end receiving the bracket arms or members and provided at its opposite end with a swinging bolt provided with a saddle to engage the free ends of the bracket members and a nut to clamp the saddle upon the said bracket ends, substantially as described.

2. A bicycle bracket comprising the bracket proper bent at one end to receive the lantern and having its opposite end provided with separated members, a clip connected at one end with the bracket and having a bolt at its free end adapted to swing between the bracket ends, a saddle on the bolt and a nut on the bolt to clamp the saddle against the bracket ends, substantially as described.

3. A bicycle lantern bracket, comprising a bracket proper having a curved portion and flattened ends, a saddle seated on the said flattened ends of the bracket, and a clip loosely engaging the said bracket and connected with the said saddle, substantially as shown and described.

4. A bicycle lantern bracket, comprising a bracket proper having a curved portion and flattened ends, a saddle seated on the said flattened ends of the bracket, a clip loosely engaging the said bracket and connected with the said saddle, and a bolt held loosely in the said saddle and directly connected with the said clip, substantially as shown and described.

JOHN CHAPPELL WELLS.

Witnesses:
EVELYN J. RICH,
F. EUGENE MILLER.